Sept. 3, 1940.  W. ELLIOTT  2,213,442
EDGING DEVICE FOR COMPOSITION BOARDS
Filed Oct. 12, 1937  2 Sheets-Sheet 2
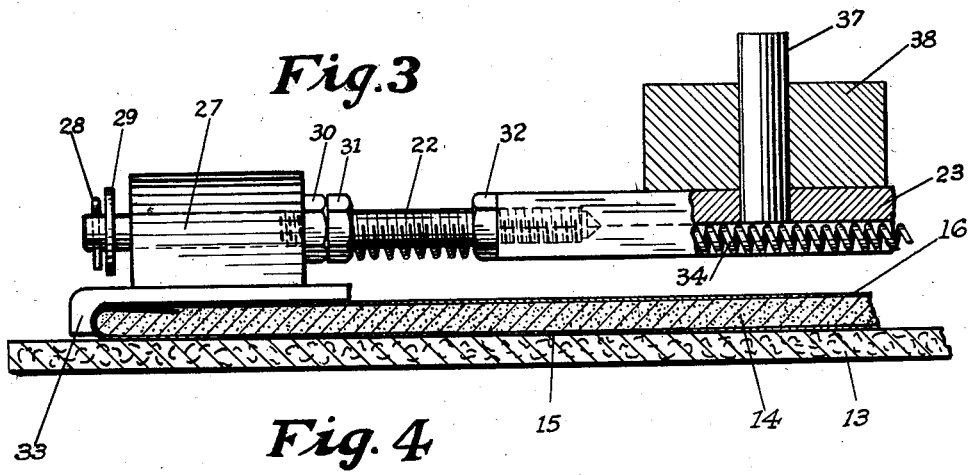
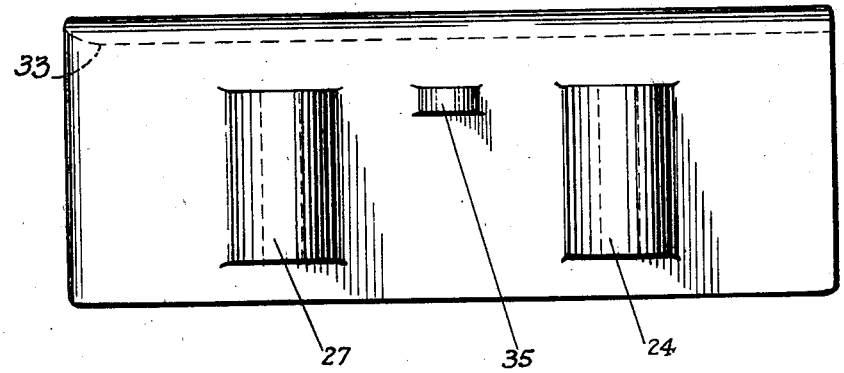
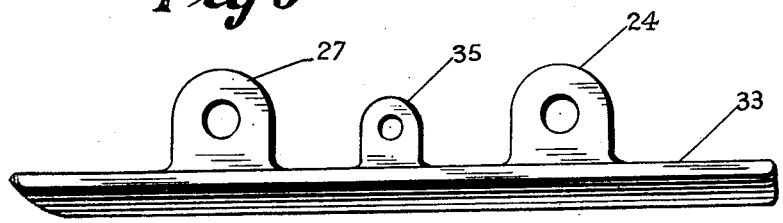
INVENTOR
WALTER ELLIOTT
BY
ATTORNEY Patented Sept. 3, 1940

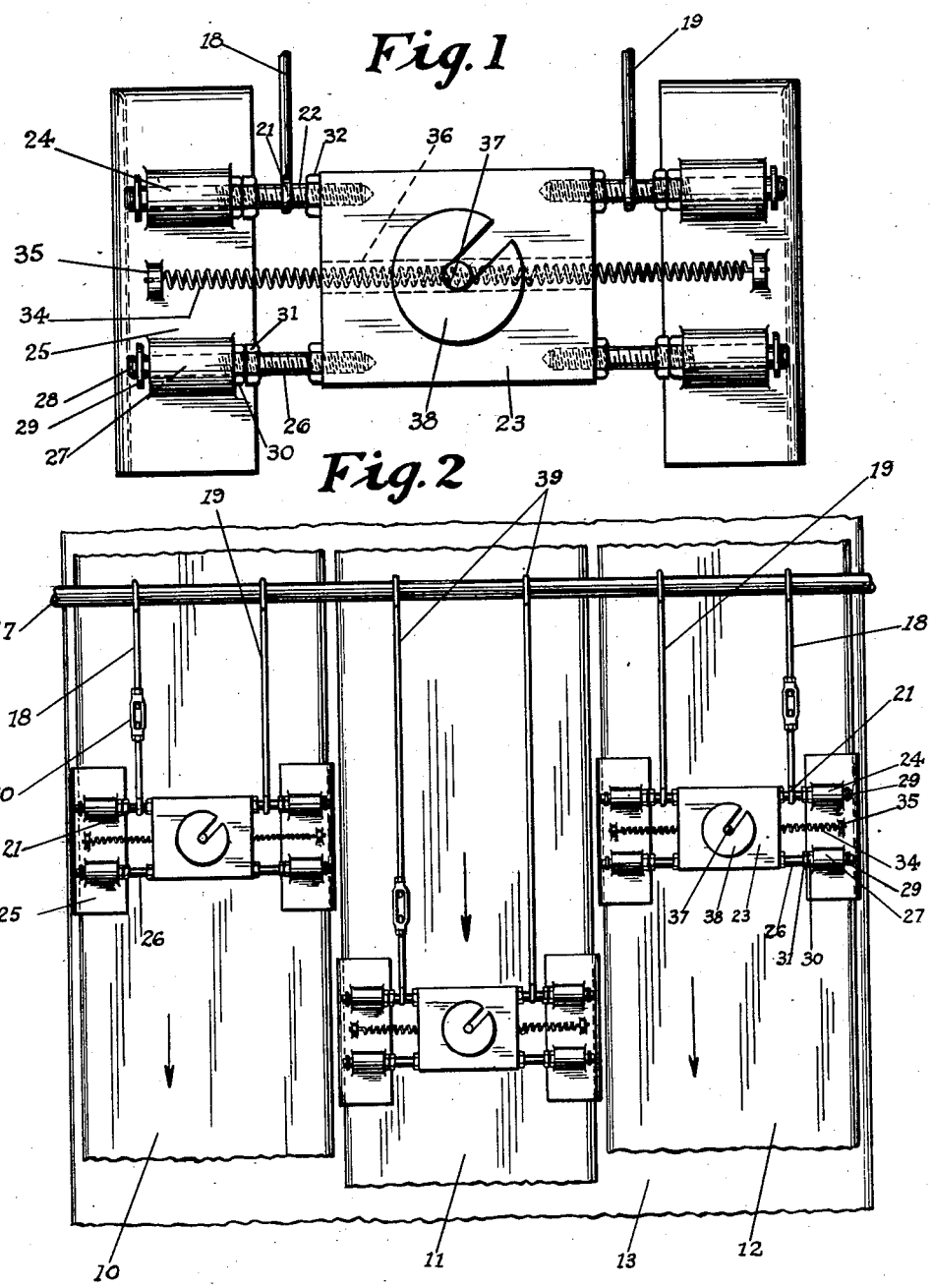

2,213,442

UNITED STATES PATENT OFFICE 2,213,442

EDGING DEVICE FOR COMPOSITION BOARDS

Walter Elliott, Caledonia, Ontario, Canada, assignor to United States Gypsum Company, Chicago, Ill., a corporation of Illinois Application October 12, 1937, Serial No. 168,679

4 Claims. (Cl. 154—1)

This invention relates to the manufacture of gypsum or other composition boards, and has reference more particularly to devices for shaping the edges of the boards and insuring a uniform width of board.

In the manufacture of gypsum plaster board, it is customary to produce three streams of paper covered gypsum board traveling side by side on an endless carrier belt. The board is quite soft when placed on the carrier belt and there is a tendency for the board to widen out as it passes under the smoothers so that allowances must be made for changes in width that occur on the belt until set of the gypsum core has occurred. The board width never remains exactly as formed and a large percentage of off-width cull boards are produced which increase manufacturing costs.

An object of the invention therefore, is to provide an improved device for accurately controlling the width of gypsum boards and eliminate the production of off-width culls.

Another object of the invention is to provide a device for shaping the edges of gypsum board; also to improve board forming devices in other respects hereinafter specified and claimed.

Reference is to be had to the accompanying drawings forming a part of this specification, in which Fig. 1 is a plan view of the device on a large scale, Fig. 2 is a plan view of three of the devices positioned over three streams of plaster board, Fig. 3 is a fragmentary sectional elevation through a stream of plaster board showing part of the edging device, Fig. 4 is a plan view of one of the edging shoes, and Fig. 5 is an elevation of the edging shoe.

Referring to the drawings by numerals, three streams of gypsum board 10, 11 and 12 are supported side by side on an endless carrier belt 13, these boards having a gypsum composition core 14 and paper cover sheets 15 and 16. A rod 17 is rigidly supported at its ends transversely of and above the belt 13. A pair of eye rods or links 18 and 19 are pivotally mounted at one end on the rod 17 in spaced relation, one of said rods 18 being provided with a turnbuckle 20 to vary the length of said rod. The forward ends of rods 18 and 19 are provided with eyes 21 which pivotally engage stud bolts 22, the latter being threaded into a central plate 23 at one end. The opposite ends of bolts 22 slidably engage within shoulders 24 formed, one shoulder on the upper surface of each of two smoothing shoes 25. Stud bolts 26 are threaded into the opposite ends of plate 23 and slidably engage within a shoulder 27 formed near the end of each shoe 25 opposite the shoulder 24. The outward movement of smoothing shoes 25 is limited by a pin 28 and washer 29 on each of the studs 22 and 26. The inward movement of the shoes 25 is limited by nuts 30 and lock nuts 31 on the studs 22 and 26, lock nuts 32 being provided on said studs to prevent the latter from unscrewing from the plate 23.

The outer edge of each shoe 25 is provided with a downwardly extending flange 33 shaped to form the rounded edge of the board 10 into semi-circular or other desired shape. The shoes 25 are yieldingly drawn together by a tension spring 34, the outer ends of which engage bosses 35 formed one on the upper middle surface of each shoe 25. The width of board produced is accurately determined by the position of stop nuts 30 which limit the inward movement of the edge flanges 33 under the action of the spring 34. The center part of spring 34 passes loosely through a milled clearance slot 36 formed transversely in the lower face of the plate 23. A central upstanding pin 37 is secured to the upper face of the plate 23 so that weights 38 can be mounted on said pin to provide the desired pressure of the shoes 25 on the board edges. Due to the narrow space between the board edges of the three board streams, rods 39 of the edge forming device of the central board stream, are made longer than the outside rods 18 and 19, thus allowing the central device to float forwardly of the two outer devices in staggered relation, thereby providing clearance. With the edge shaping devices described, board widths are maintained absolutely uniform and off-width culls are eliminated.

I would state in conclusion that, while the illustrated example constitutes a practical embodiment of my invention, I do not wish to limit myself precisely to these details since manifestly, the same may be considerably varied without departing from the spirit of the invention as defined in the appended claims.

Having thus described my invention, I claim as new and desire to secure by Letters Patent:

1. In an edging device, means for continuously moving a stream of composition board, a pair of movable shoes engaging the edges of said stream of board to form the same, said shoes being yieldingly urged together, and stop means for positively limiting the movement of said shoes together so as to fix the width of said composition board.

2. In a device of the class described, a pair of edging shoes having depending edge flanges adapted to shape the edges of a moving stream of composition board, a tension spring connecting said shoes and adapted to yieldingly urge said shoes together to reduce the width of said board, and stop means for limiting the movement of said shoes together so as to fix the width of said board to a predetermined exact width.

3. In a device of the class described, means for continuously moving a plurality of streams of composition boards in spaced, parallel relation, a rod extending transversely above said streams of board, a pair of edge smoothing shoes engaging the edges of each board stream, a pair of pivotally mounted links extending between said rod and each of said shoes so as to support said shoes, means for varying the edge pressure of said shoes on said board streams, and stop means for limiting the inward movement of said shoes and fixing the widths of said boards.

4. In a forming device for the edges of plastic composition boards, means for moving a plurality of streams of composition boards in spaced, parallel relation, a pair of yieldingly connected edge smoothing shoes engaging the edges of each board stream, means for limiting the inward movement of each pair of shoes so as to fix the maximum width of each board stream, and links of different lengths connecting each pair of shoes to a fixed support whereby said shoes are maintained in staggered relation.

WALTER ELLIOTT.